UNITED STATES PATENT OFFICE.

LÉON HENRI CHANUT, OF AUBERVILLIERS, FRANCE, ASSIGNOR, BY MESNE ASSIGNMENTS, TO ASIA RUBBER COMPANY OF AMERICA, A CORPORATION OF MAINE.

PROCESS FOR SEPARATING RUBBER OR RUBBER-LIKE SUBSTANCES AND RESIN FROM MATERIALS CONTAINING THE SAME.

978,696.  Specification of Letters Patent.  Patented Dec. 13, 1910.

No Drawing.   Application filed June 27, 1910.  Serial No. 569,212.

*To all whom it may concern:*

Be it known that I, LÉON HENRI CHANUT, a citizen of the French Republic, residing at Aubervilliers, Seine, France, have invented certain new and useful Improvements in Processes for Separating Rubber or Rubber-Like Substances and Resin from Materials Containing the Same, of which the following is a specification.

This invention relates to the treatment of materials containing rubber or a similar substance (such as gutta-percha, balata, etc.) and resin, and more particularly to the treatment of the material called "dead Borneo" for the purpose of separating from each other the said rubber or similar substance and resin. As has been known for a long time, the treatment in question can be carried out by submitting the products to be treated, to a series of double attacks or reactions each comprising a first elementary attack carried out by means of a substance which can dissolve rubber, for instance, by means of carbon bisulfid, and a second attack carried out by means of a substance which produces, simultaneously with a precipitation of the rubber dissolved during the preceding attack, a solution of the resin, for instance by means of acetone. As, however, up to the present it has been impossible to find the proportions and the periods of reaction which were really suitable for carrying out the treatment in question in an economical manner, the results hitherto obtained were of very little use from the industrial point of view. Of course rubber was obtained, but it was of a quality which at best was only mediocre.

The present invention overcomes the said disadvantage however. It determines in fact both the proportions in question, and the periods of reaction.

It consists, in short, in the following process which has merely to be followed step by step in order to overcome all the difficulties.

If it is desired to treat 100 kg. of "dead Borneo," the process is as follows. A kneading machine is used, into which are introduced, after having been rolled and then disintegrated, the said 100 kg. of "dead Borneo," and then 50 liters of commercial carbon bisulfid. The reaction is allowed to take place for five minutes, at the end of which period the whole of the materials introduced into the kneading machine forms a kind of paste. The kneading machine is then started, and an additional quantity of 97.5 liters of carbon bisulfid is slowly added. Having allowed this latter reaction to go on for about 20 minutes, 40 liters of commercial acetone are added and allowed to act for another 15 minutes, at the end of which period the kneading machine is stopped, and the liquid found therein, is removed. The kneading machine is restarted, and 40 liters of carbon bisulfid are admitted into it and allowed to act for 20 minutes. 50 liters of acetone are added and allowed to act for another 20 minutes, whereupon the kneading machine is again stopped, and the liquid contained therein is again removed. The kneading machine is again restarted, after a further 40 liters of carbon bisulfid has been introduced into it. Almost immediately 20 liters of acetone is added, and the reaction is allowed to go on for another 20 minutes. The kneading machine is again stopped, and the liquid contained therein is again extracted. The kneading machine is restarted, after having introduced 56 liters of acetone, and the reaction is allowed to go on for another 20 minutes. The kneading machine is again stopped, and the liquid contained therein, is again removed. This last operation *i. e.* the introduction of 56 liters of acetone and kneading is repeated several times, preferably another three times, after which only chips of rubber are left in the kneading machine, which are removed from the latter in their turn.

The treatment thus takes three hours with the use, on the one hand, of 50+97.5+40+40=227.5 liters of carbon bisulfid, and on the other hand, of 40+50+20+56+56+56+56=334 liters of acetone, the mixture of which, collected at the end of each partial operation or stage of the process, contains in solution the whole of the resin of the initial product, and has merely to be submitted to two successive operations of fractional distillation, one carried up to about 46° C. and the other up to about 72° C., in order to separate therefrom the carbon bisulfid originally used, the acetone originally used and the extracted resin.

It must be pointed out that the process, the different stages of which have been described, is preferably carried out in the cold state.

What I claim as my invention and desire to secure by Letters Patent is:—

1. A process for treating material containing a rubber-like substance, and resin, such as "dead Borneo," for the purpose of separating from each other the said rubber or similar substance and the resin, consisting in placing the material in a kneading machine, adding for every 100 kg. of "dead Borneo" 50 liters of carbon bisulfid, which is allowed to act for five minutes; starting the kneading machine, and simultaneously adding for every 100 kg. of "dead Borneo" 97.5 liters of carbon bisulfid which is allowed to act for 20 minutes, then adding for every 100 kg. of "dead Borneo" 40 liters of acetone which is allowed to act for 15 minutes; then stopping the kneading machine and extracting the liquid contained therein; then restarting the kneading machine and adding for every 100 kg. of "dead Borneo" 40 liters of carbon bisulfid which is allowed to act for 20 minutes, then adding for every 100 kg. of "dead Borneo" 50 liters of acetone, which is allowed to act for 20 minutes; then again stopping the kneading machine and extracting the liquid; then restarting the kneading machine and adding for every 100 kg. of "dead Borneo" 40 liters of carbon bisulfid, and then of 20 liters of acetone, which are allowed to act for 20 minutes; then again stopping the kneading machine and extracting the liquid; and finally making a series of successive additions each of 56 liters of acetone for every 100 kg. of "dead Borneo," the reaction of each of which is allowed to go on for 20 minutes.

2. A process for treating material containing a rubber-like substance, and resin, such as "dead Borneo," for the purpose of separating from each other the said rubber or similar substance and the resin, consisting in placing the material in a kneading machine, adding for every 100 kg. of "dead Borneo" 50 liters of carbon bisulfid, which is allowed to act for five minutes; starting the kneading machine, and simultaneously adding for every 100 kg. of "dead Borneo" 97.5 liters of carbon bisulfid which is allowed to act for 20 minutes, then adding for every 100 kg. of "dead Borneo" 40 liters of acetone which is allowed to act for 15 minutes; then stopping the kneading machine and extracting the liquid contained therein; then restarting the kneading machine and adding for every 100 kg. of "dead Borneo" 40 liters of carbon bisulfid which is allowed to act for 20 minutes, then adding for every 100 kg. of "dead Borneo" 50 liters of acetone, which is allowed to act for 20 minutes; then again stopping the kneading machine and extracting the liquid; then restarting the kneading machine and adding for every 100 kg. of "dead Borneo" 40 liters of carbon bisulfid, and then of 20 liters of acetone, which are allowed to act for 20 minutes; then again stopping the kneading machine and extracting the liquid and finally making a series of four successive additions each of 56 liters of acetone for every 100 kg. of "dead Borneo," the reaction of each of which is allowed to go on for 20 minutes before extracting the liquid, the whole process being carried out in the cold state.

In testimony whereof I have hereunto set my hand in presence of two subscribing witnesses.

LÉON HENRI CHANUT.

Witnesses:
J. L. JASTON,
CHARLES WEISMANN.